H. O. WILLIAMS.
ANIMAL CATCHER.
APPLICATION FILED APR. 18, 1917.
1,277,017.
Patented Aug. 27, 1918.
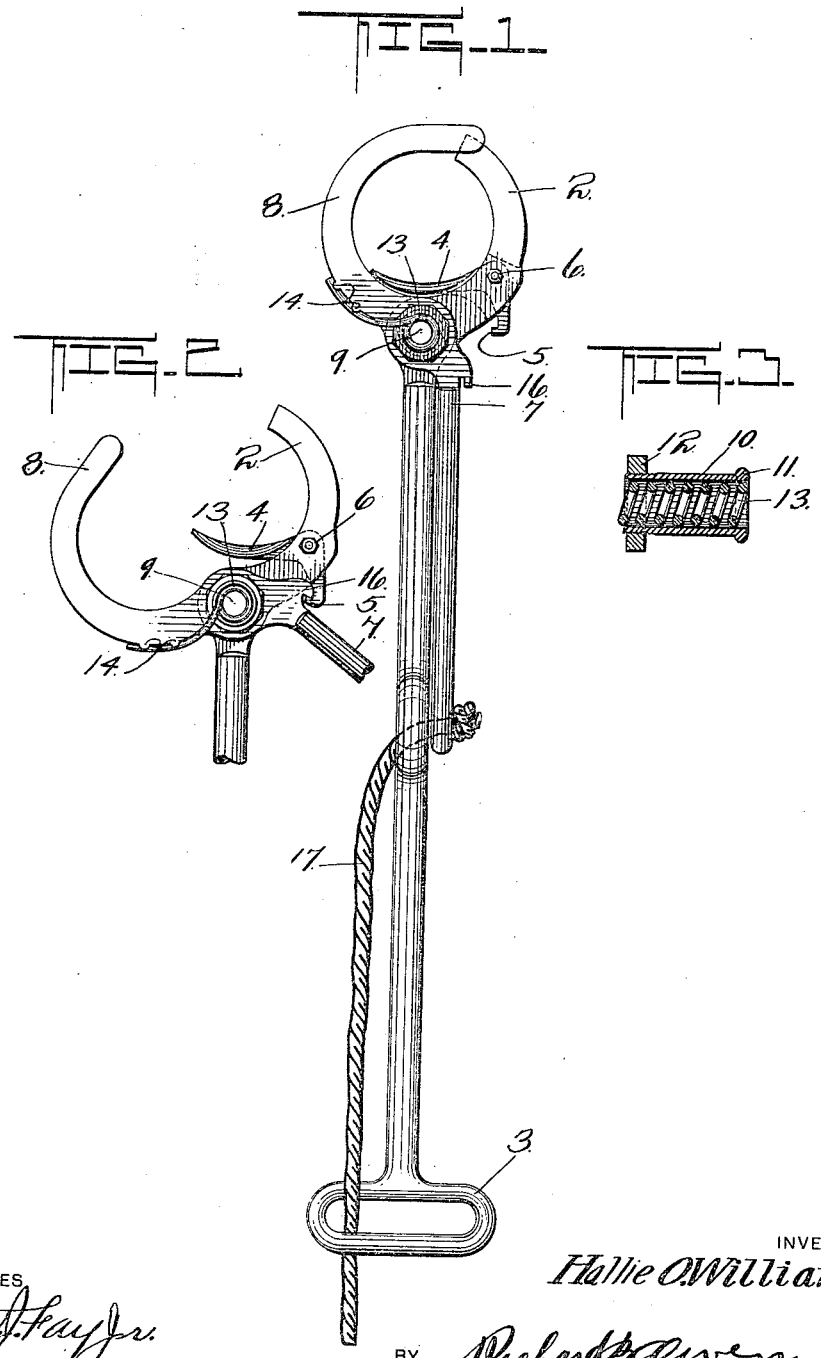
INVENTOR
Hallie O. Williams.
BY
ATTORNEY

UNITED STATES PATENT OFFICE.

HALLIE OWEN WILLIAMS, OF WATSON, NEW YORK.

ANIMAL CATCHER AND HOLDER.

1,277,017.     Specification of Letters Patent.     Patented Aug. 27, 1918.

Application filed April 18, 1917. Serial No. 163,000.

*To all whom it may concern:*

Be it known that I, HALLIE OWEN WILLIAMS, a citizen of the United States, residing at Watson, in the county of Lewis and State of New York, have invented certain new and useful Improvements in Animal Catchers and Holders, of which the following is a specification.

This invention relates to animal catchers and holders, the object being to provide an implement which will automatically embrace the leg of the animal as soon as the implement comes in contact with the leg.

Another object of the invention is to provide jaws which are normally held apart but which are equipped with releasing means which will automatically operate when placed in engagement with the leg of an animal, handles being associated with the jaws in order to facilitate manipulation of the latter.

The above and other objects and advantages of this invention will be in part described, and in part understood from the following description of the present preferred embodiment, the same being illustrated in the accompanying drawing, in which Figure 1 is a side elevational view of an implement constructed in accordance with my invention, the jaws being shown in a closed position.

Fig. 2 is a fragmentary perspective view of the device, showing the jaws in an open position.

Fig. 3 is a longitudinal sectional view of the tubular shaft showing the spring mounted therein.

In the drawings a handle 1 is provided which is preferably made of metal and is of a circular cross sectional configuration. One end thereof is flattened and depressed to provide an arcuate jaw 2. The opposite end of the handle 1 is formed to provide a handle loop 3. A trip member 4 is pivotally mounted in the jaw 2, said member having one end thereof extended through the jaw and the terminal equipped with a laterally projecting tooth 5. The trip 4 is detachably engaged with the jaw 2 by a nut and bolt 6.

A handle 7 is provided which is relatively shorter than the handle 1 and is likewise of a circular configuration in cross section. One end thereof is flattened and has a portion depressed to provide a circular jaw 8 which is greater in circumference than the jaw 2 so that the free end of the jaw 8 will hold the free terminal of the jaw as shown to advantage in Fig. 1. The handles 1 and 7 are preferably slightly enlarged at the juncture of the jaws 2 and 8 and are provided with alined openings 9.

A tubular shaft 10 is arranged through said openings 9, one end 11 thereof being provided with an annulus to abut one of the jaws. The opposite end of the shaft is provided with screw threads which are adapted for threaded engagement with a nut 12, the latter adapted to engage the other jaw but permitting free movement of the jaws on said shaft 10.

A coil spring 13 is mounted in the shaft 10, one end thereof projecting beyond one end of the shaft and being provided with semi-circular recesses therein which engage corresponding projections 14 which are formed on the jaw 8. The opposite end of said springs 13 embraces the shank of the handle 1 as indicated at 15. As will be obvious the spring 13 will normally hold the jaws 2 and 8 in a closed position as shown in Fig. 1.

A tooth 16 projects beyond the periphery of the handle 7, adjacent the axis of the latter and is adapted for interlocking engagement with the tooth of the trip 4 whereby the jaws 10, when desired, will be held in an open position. In this position, as shown to advantage in Fig. 2, the trip 4 will extend outwardly from the jaws so that when pressure is exerted upon the trip, sufficient movement of the latter will be permitted in order to disengage the teeth 5 and 16.

A cable 17 is engaged with the free end of the handle 7 and extends through the handle 1, so that the handles may be held in close proximity to each other in order to positively retain said jaws in a closed position.

In operation therefor assuming that the device is in a position as shown in Fig. 2 of the drawings it will be necessary merely to contact the trip member 4 with the leg of the animal. This will cause the teeth 5 and 16 to be disengaged as above indicated, and the resiliency of the spring 13 will automatically close the jaws. Pressure upon the cable 17 will of course prevent the jaws from being casually opened.

It will be understood that the above description and accompanying drawings comprehend only the general and preferred embodiment of my invention and that various minor changes in details of construction, proportion and arrangement of parts may be made within the scope of the appended claims without sacrificing any of the advantages of my invention.

Having thus fully described my invention, what I claim as new and desire to secure by Letters Patent is:—

1. A device as set forth including jaws, a tubular pivot therefor, a spring within said tubular pivot for normally holding the jaws closed, trip means to hold said jaws open against the resistance of said spring, said trip being releasable when pressure is exerted thereon.

2. An animal catcher, a holder including complemental jaws, a tubular member uniting said complemental jaws, means within said tubular member to normally hold said jaws closed, and a trip member mounted in one of said jaws, coöperable with the other jaw to hold said jaws open against the resistance of said means, pressure on said trip means releasing the same to permit automatic closing of the jaws.

3. A hog catcher and holder including a pair of connecting jaws, a detachable tubular shaft uniting the said jaws, a detachable coiled spring mounted in the axis of said jaws and within said tubular detachable shaft, one end thereof being engaged with one of said jaws and the opposite end being engaged with the other jaw for normally holding said jaws closed, and means for holding said jaws open against the resistance of said spring.

In testimony whereof I affix my signature in presence of two witnesses.

HALLIE OWEN WILLIAMS.

Witnesses:
E. B. CHAPMAN,
STEPHEN WALDRON.

Copies of this patent may be obtained for five cents each, by addressing the "Commissioner of Patents, Washington, D. C."